(12) United States Patent  
Thirukannan et al.

(10) Patent No.: US 12,395,274 B2  
(45) Date of Patent: Aug. 19, 2025

(54) LAYERED MISSING PACKET DETECTION

(71) Applicant: QUALCOMM Incorporated, San Diego, CA (US)

(72) Inventors: Karthik Thirukannan, San Diego, CA (US); Arun Prasanth Balasubramanian, San Diego, CA (US); Jason Tan, San Diego, CA (US); Shailesh Maheshwari, San Diego, CA (US); Ankur Srivastava, Lucknow (IN); Mohammad Ashraf, Cuttack (IN); Rahul Maringanti, Hyderabad (IN); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/922,746

(22) PCT Filed: Jun. 22, 2021

(86) PCT No.: PCT/US2021/038498  
§ 371 (c)(1),  
(2) Date: Nov. 1, 2022

(87) PCT Pub. No.: WO2022/005819  
PCT Pub. Date: Jan. 6, 2022

(65) Prior Publication Data  
US 2023/0163883 A1 May 25, 2023

(30) Foreign Application Priority Data  
Jun. 29, 2020 (IN) .............................. 202041027478

(51) Int. Cl.  
*H04L 1/1607* (2023.01)  
*H04L 1/1829* (2023.01)

(52) U.S. Cl.  
CPC .......... *H04L 1/1642* (2013.01); *H04L 1/1848* (2013.01)

(58) Field of Classification Search  
CPC .... H04L 1/1642; H04L 1/1848; H04L 1/1832  
See application file for complete search history.

(56) References Cited

U.S. PATENT DOCUMENTS

| | | | |
|---|---|---|---|
| 12,101,238 B2 * | 9/2024 | Cheng | H04L 69/22 |
| 2008/0310368 A1 * | 12/2008 | Fischer | H04L 47/10 370/331 |
| 2009/0003283 A1 * | 1/2009 | Meylan | H04L 1/008 370/331 |

(Continued)

FOREIGN PATENT DOCUMENTS

| | | | | |
|---|---|---|---|---|
| CN | 104935413 A | | 9/2015 | |
| EP | 2169915 A1 * | | 3/2010 | H04L 1/009 |
| WO | 2017192138 A2 | | 11/2017 | |

OTHER PUBLICATIONS

International Search Report and Written Opinion—PCT/US2021/038498—ISA/EPO—Oct. 14, 2021.

*Primary Examiner* — Ayaz R Sheikh  
*Assistant Examiner* — Tarell A Hampton  
(74) *Attorney, Agent, or Firm* — Patterson+ Sheridan, L.L.P.

(57) ABSTRACT

A wireless communication device is described. The wireless communication device includes a memory and a processor in electronic communication with the memory. The processor is configured to determine a packet data convergence protocol (PDCP) packet count corresponding to a last radio link control (RLC) packet received in-sequence. The processor is also configured to detect a missing PDCP packet based on a comparison of the PDCP packet count and a sequence number of a last PDCP packet received in-sequence.

26 Claims, 11 Drawing Sheets

(56) References Cited

U.S. PATENT DOCUMENTS

| | | | |
|---|---|---|---|
| 2009/0318152 A1* | 12/2009 | Maheshwari | H04L 1/1822 455/436 |
| 2010/0189059 A1* | 7/2010 | Yang | H04L 1/009 370/329 |
| 2010/0322194 A1* | 12/2010 | Hu | H04W 36/023 370/331 |
| 2012/0127318 A1* | 5/2012 | Song | H04N 7/181 348/E7.085 |
| 2012/0300648 A1* | 11/2012 | Yang | H04L 1/20 370/252 |
| 2015/0264615 A1* | 9/2015 | Zhao | H04W 24/10 370/329 |
| 2015/0326456 A1* | 11/2015 | Dudda | H04L 43/062 370/252 |
| 2016/0255675 A1* | 9/2016 | Van Lieshout | H04L 1/1893 370/329 |
| 2016/0315868 A1 | 10/2016 | Zhang et al. | |
| 2017/0181185 A1* | 6/2017 | Lee | H04W 72/23 |
| 2018/0098309 A1 | 4/2018 | Yi et al. | |
| 2018/0132183 A1* | 5/2018 | Gattu | H04W 52/0203 |
| 2018/0368018 A1 | 12/2018 | Kim et al. | |
| 2019/0349810 A1* | 11/2019 | Cho | H04W 28/06 |
| 2021/0021504 A1* | 1/2021 | Balasubramanian | H04L 1/1864 |
| 2021/0029226 A1* | 1/2021 | Hsu | H04L 69/28 |
| 2022/0014961 A1* | 1/2022 | Baek | H04W 28/0263 |
| 2022/0030659 A1 | 1/2022 | Kim | |
| 2022/0377602 A1* | 11/2022 | Kim | H04W 28/12 |
| 2023/0388852 A1* | 11/2023 | Sharma | H04W 28/065 |
| 2024/0031066 A1* | 1/2024 | Shirivastava | H04W 4/06 |

* cited by examiner

LAYERED MISSING PACKET DETECTION

RELATED APPLICATION

This application is a national stage application under 35 U.S.C. 371 of PCT/US2021/038498, filed Jun. 22, 2021, which is related to and claims priority of Indian Application No. 202041027478, filed Jun. 29, 2020 in India, for "LAYERED MISSING PACKET DETECTION."

FIELD OF DISCLOSURE

The present disclosure relates generally to electronic devices. More specifically, the present disclosure relates to layered missing packet detection.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently, or with higher quality are often sought after.

Some electronic devices (e.g., cellular phones, smartphones, laptop computers, etc.) communicate with other electronic devices. For example, electronic devices may transmit and/or receive radio frequency (RF) signals to communicate. Improving electronic device communication may be beneficial.

DETAILED DESCRIPTION

Figure 1:
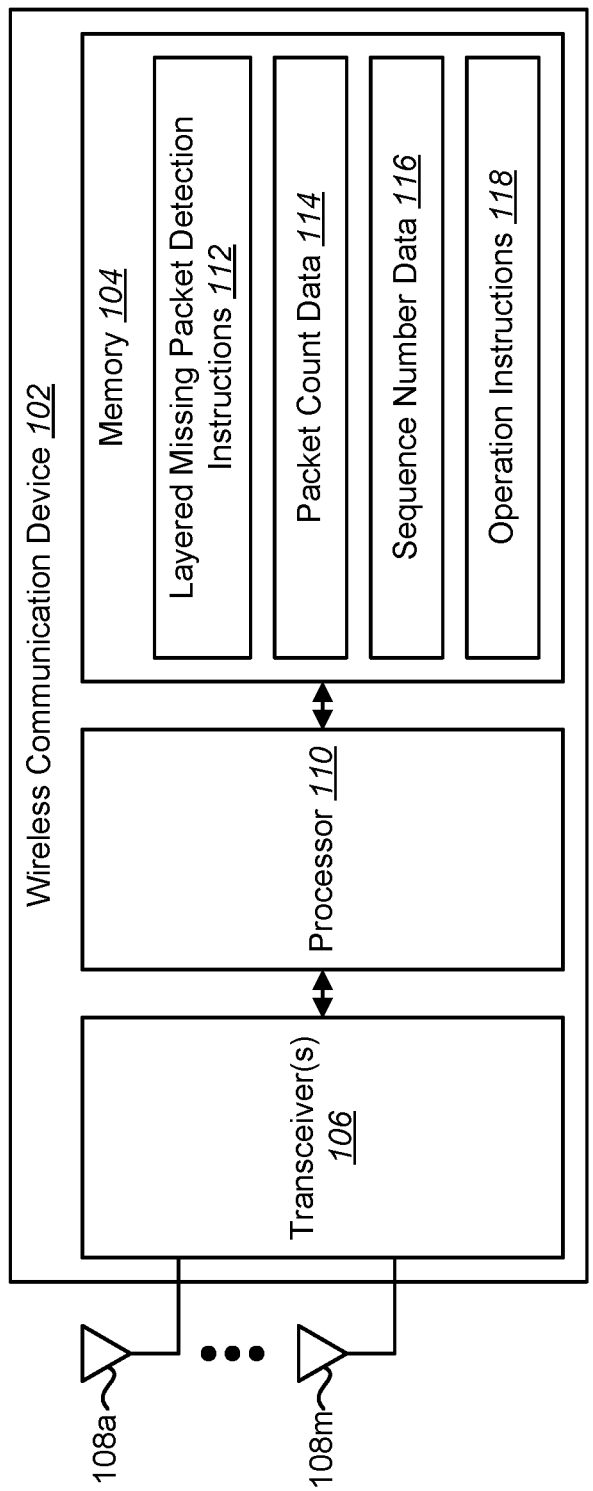
FIG. 1 is a block diagram illustrating one example of a wireless communication device in which systems and methods for layered missing packet detection may be implemented.

Some configurations of the systems and methods disclosed herein may relate to layered missing packet detection.

As used herein, the term "layer" may refer to a layer or sub-layer of a communication protocol stack. Examples of layers (in ascending order, for instance) may include a physical (PHY) layer, a medium access control (MAC) layer, a radio link control (RLC) layer, a packet data convergence protocol (PDCP) layer, and a radio resource control (RRC) layer. In some examples, the RLC layer may include functions such as automatic repeat request (ARQ), segmentation of data, and/or reassembly of data, etc. In some examples, the PDCP layer may include functions such as reordering packet data, transferring data to upper layers, integrity protection, ciphering data, and/or deciphering data, etc. While some examples of layers are given herein, some configurations of the systems and methods described may be implemented with additional or alternative layers.

A missing packet may be a packet that is lost or is not received correctly. In some cases, a missing packet may occur at a layer without a corresponding missing packet at one or more other layers. In some examples, a missing packet that occurs at a layer without a corresponding missing packet at another layer (e.g., neighboring layer) may be referred to as a layered, unmatching, nonconforming, and/or unbalanced missing packet. For example, a missing packet may occur at a layer that is higher than another layer where a corresponding missing packet does not occur. For instance, one or more missing packets may occur at the PDCP layer without a missing packet occurring at the RLC layer. In some cases, layered missing packets may occur due to a network error. For example, one or more packets at a layer (e.g., PDCP) may be lost in transmission between network devices (e.g., base stations) and/or may be incorrectly numbered by a network device while one or more packets at a relatively lower layer (e.g., RLC, MAC, PHY) may be correctly transmitted and/or received.

A layered missing packet may cause problems at a receiving device. For example, a layered missing packet may be detected at one layer, which may cause a receiving device to perform one or more missing packet procedures at that layer, while corresponding missing packet procedures are not performed at another layer. For instance, when a missing packet occurs at the PDCP layer without a corresponding missing packet at the RLC layer, the PDCP layer may start a reordering timer and may store (e.g., buffer) subsequent packets for reordering, while the RLC layer may not perform corresponding missing packet procedures (e.g., ARQ, etc.). This scenario may cause increased memory consumption (until a reordering timer expires and/or the buffered packets are flushed, for instance) and/or may cause delay in passing the packets to a higher layer. Some examples of the systems and methods described herein may detect one or more layered missing packets and/or may perform one or more operations to mitigate and/or compensate for one or more layered missing packets. For instance, some of the systems and methods described herein may be utilized to detect a layered missing packet and/or PDCP sequence number hole in a network transmission and perform one or more operations to reduce memory impact on a receiving device in some scenarios and/or to reduce the latency of packet passing and/or data transmission.

Some configurations of the systems and methods disclosed herein may be utilized with single or multiple receive (Rx) links. For example, the systems and methods disclosed herein may be utilized with a single Long-Term Evolution (LTE) link, multiple LTE links, a single Fifth Generation (5G) or New Radio (NR) link, multiple 5G or NR links, an LTE link and 5G link, Evolved Universal Mobile Telecommunications Service (UMTS) Terrestrial Radio Access Network (E-UTRAN) New Radio-Dual Connectivity (ENDC), multiple radio access technology (RAT) links, multiple carriers, multiple bearers, etc.

It should be noted that some examples of the systems and methods described herein may be utilized and/or implemented with one, two, or more links. For example, an electronic device may receive data (e.g., packet data) on two or more links in some cases and/or approaches. For instance, an electronic device may receive data on two cellular (e.g., LTE, 5G) links and a Wi-Fi link. In another example, an electronic device may receive data on multiple Wi-Fi links and one or more cellular (e.g., LTE, 5G) links. In yet another example, an electronic device may receive data on a cellular (e.g., LTE, 5G) link, on a personal area network (PAN) (e.g., Bluetooth) link, and on a Wi-Fi link. Other variations are possible (e.g., two or more wireless local area network (WLAN) links, two or more PAN links, a combination of WLAN, cellular, and/or PAN links, etc.).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of a wireless communication device 102 in which systems and methods for layered missing packet detection may be implemented. The wireless communication device 102 may be a device or apparatus for transmitting and/or receiving RF signals. Examples of the wireless communication device 102 may include a user equipment (UE), smartphone, tablet device, computing device, computer (e.g., desktop computer, laptop computer, etc.), television, camera, virtual reality device (e.g., headset), vehicle (e.g., semi-autonomous vehicle, autonomous vehicle, etc.), robot, aircraft, drone, unmanned aerial vehicle (UAV), healthcare equipment, gaming console, Internet of Things (IoT) device, etc. The wireless communication device 102 may include one or more components or elements. One or more of the components or elements may be implemented in hardware (e.g., circuitry) or a combination of hardware and instructions (e.g., a processor with software stored in memory).

In some configurations, the wireless communication device 102 may include a processor 110, a memory 104, one or more transceivers 106, and/or one or more antennas 108a-m. In some configurations, the wireless communication device 102 may include one or more other components and/or elements. For example, the wireless communication device 102 may include a display (e.g., touchscreen). The processor 110 may be circuitry (e.g., electronic circuitry, integrated circuit, etc.) configured to perform one or more functions. In some configurations, the processor 110 may execute instructions to perform the one or more functions. In some configurations, the processor 110 may include one or more functionalities that are structurally implemented in the processor 110. In some configurations, the processor 110 may be a baseband processor, a modem, a modem processor, an application processor, and/or any combination thereof. The processor 110 may be coupled to (e.g., in electronic communication with) the memory 104 and/or transceiver(s) 106. In some examples, the wireless communication device 102 and/or the processor 110 may be configured to perform one or more of the methods 400, 500, 600, 700, 800 and/or method elements described in relation to one or more of the Figures. For example, the wireless communication 102 and/or the processor 110 may be configured to perform one or more of the techniques described in relation to FIG. 11.

The memory 104 may store instructions and/or data. The processor 110 may access (e.g., read from and/or write to) the memory 104. Examples of instructions and/or data that may be stored by the memory 104 may include layered missing packet detection instructions 112, packet count data 114, sequence number data 116, operation instructions 118, other data, and/or instructions for other elements, etc.

The transceiver(s) 106 may enable the wireless communication device 102 to communicate with one or more other electronic devices. For example, the transceiver(s) 106 may provide an interface for wireless communications. In some configurations, the transceiver(s) 106 may be coupled to one or more antennas 108a-m for transmitting and/or receiving RF signals. For example, the transceiver 106 may enable one or more modes of wireless (e.g., cellular, WLAN, PAN, etc.) communication. The transceiver(s) 106 may include one or more transmitters and/or one or more receivers. In some configurations, the transceiver(s) 106 may be included in an RF front-end and/or may include an RF front-end. In some configurations, the transceiver(s) 106 may include one or more switches, one or more filters, one or more power amplifiers, one or more downconverters, and/or one or more upconverters, etc., to enable wireless communication.

In some configurations, multiple transceivers 106 may be implemented and/or utilized. For example, one or more transceivers 106 may be utilized for cellular (e.g., 3G, LTE, Code Division Multiple Access (CDMA), 5G, etc.) communications, and/or one or more transceivers 106 may be utilized for WLAN (e.g., Institute of Electrical and Electronics Engineers (IEEE) 802.11) communications. In some configurations, the transceiver(s) 106 may send information (e.g., uplink packets, uplink control information, etc.) to and/or receive information (e.g., downlink packets, downlink control information, etc.) from one or more devices (e.g., base station, evolved NodeB (eNodeB or eNB), next generation NodeB (gNB), etc.). In some examples, one or more network devices (e.g., base stations, access points, wireless communication devices, etc.) may send packets to the wireless communication device 102.

As used herein, the term "packet" may refer to a set of information at a layer or layers. For example, a PHY layer packet may include information in one or more frames, one or more subframes, and/or one or more slots. In some examples, a PHY layer packet may include one or more MAC packet data units (PDUs). A MAC PDU may include a MAC header and payload (e.g., MAC service data unit (SDU)). A MAC payload may include an RLC packet. An RLC packet may include an RLC header and payload (e.g., RLC SDU). An RLC header may include an RLC sequence number. The RLC sequence number may be a number and/or index for an RLC packet in a sequence of RLC packets. RLC sequence numbers may be monitored and/or stored as sequence number data 116 in the memory 104. For example, the sequence number data 116 may include an RLC sequence number of a last (e.g., most recent) RLC packet received in-sequence. The RLC sequence number of a last RLC packet received in-sequence may be referred to as a lower edge of an RLC receive window. The term "in-sequence" may denote packets received in a consecutive order (e.g., in a consecutively numbered order) and/or in a sequential order. An RLC payload may include a PDCP packet. A PDCP packet may include a PDCP header and payload (e.g., PDCP SDU). A PDCP header may include a PDCP sequence number. The PDCP sequence number may be a number and/or index for a PDCP packet in a sequence of PDCP packets. PDCP sequence numbers may be monitored and/or stored as sequence number data 116 in the memory 104. For example, the sequence number data 116 may include a PDCP sequence number of a last (e.g., most recent) PDCP packet received in-sequence. In some examples, a sequence number of a last PDCP packet received in-sequence or a last submitted PDCP PDU to an upper layer may be referred to as RX_DELIV or RX_DELIV-1. The PDCP sequence number of a last PDCP packet received in-sequence may be referred to as a lower edge of a PDCP receive window. A PDCP payload may include upper-layer information (e.g., Internet Protocol (IP) packet(s)).

In some configurations, an RLC sequence number and/or a PDCP sequence number may be utilized to detect one or more missing packets. In some cases, one or more missing PDCP packets may correspond to one or more missing RLC packets. An RLC sequence number and/or PDCP sequence number may be utilized to detect missing packets and/or to trigger one or more operations (e.g., ARQ, reordering, etc.) to handle the missing packets. As described above, one or more layered missing packets may occur in some cases, where a packet is missing at a layer (e.g., PDCP layer) without a corresponding missing packet at another layer (e.g., RLC) layer. In some examples, a layered missing packet may trigger one or more operations to handle the missing packet at a layer (e.g., PDCP layer), without triggering corresponding operations at another layer (e.g., RLC layer).

In some configurations, the memory 104 may include layered missing packet detection instructions 112. The layered missing packet detection instructions 112 may be instructions for detecting a layered missing packet or packets. For example, the processor 110 may execute the layered missing packet detection instructions 112 to detect when a missing PDCP packet occurs without a corresponding missing RLC packet (e.g., when an RLC packet is received). The wireless communication device 102 may receive packets using the antenna(s) 108a-m and/or transceiver(s) 106. The processor 110 may extract RLC sequence numbers from RLC packets and/or PDCP sequence numbers from PDCP packets, which may be stored as sequence number data 116 in the memory 104.

The processor 110 may be configured to determine a PDCP packet count corresponding to a last RLC packet received in-sequence. For example, the processor 110 may execute the layered missing packet detection instructions 112 to determine a PDCP packet count corresponding to a last RLC packet received in-sequence. An RLC packet received in-sequence may be an RLC packet that was received in a sequential order (e.g., without a missing RLC packet and/or without a skip in RLC sequence number) in a set of RLC packets. A PDCP packet count may be a value, quantity, and/or number that indicates a PDCP packet relative to an RLC packet. For instance, the PDCP packet count may indicate a PDCP packet number (e.g., target PDCP sequence number) for a case in which a PDCP packet would be received in-sequence for each RLC packet received in-sequence. In some configurations, the processor 110 may determine the PDCP count at the PDCP layer using the PDCP sequence number. For example, when a packet is moved from the RLC layer to the PDCP layer, the PDCP layer may provide (e.g., feed back) the PDCP count value for that packet to the RLC layer. In this way, the RLC layer may be aware of the PDCP count for all packets and may infer the PDCP packet count corresponding to the lower edge of the receive window. In some configurations, the processor 110 may increment the PDCP packet count for each RLC packet received in-sequence. For example, the processor 110 may determine the PDCP packet count by extracting a PDCP sequence number from an RLC packet that moved the lower edge of the RLC receive window. In some examples, the PDCP packet count may be expressed as Y+n, where Y is an initial PDCP packet sequence number in a set of packets and n is a number of RLC packets received in-sequence in the set of packets. For instance, n may indicate a number of RLC packets received in-sequence from an initial RLC packet sequence number X (and/or may correspond to a lower edge of the RLC receive window). An initial PDCP packet sequence number may correspond to an initial PDCP packet received in a communication session, in a link, after a break in communication (e.g., after missing packet handling), etc. An initial RLC packet sequence number may correspond to an initial RLC packet received in a communication session, in a link, after a break in communication (e.g., after missing packet handling), etc. The processor 110 may store the PDCP packet count as packet count data 114 in memory 104 in some configurations.

In some examples, the PDCP packet count may correspond to the sequence number of the last PDCP received in-sequence (e.g., RX_DELIV or RX_DELIV-1) in a case that PDCP packets have been received in-sequence in tandem with RLC packets in-sequence. In a case where a missing PDCP packet occurs without a corresponding missing RLC packet, the PDCP packet count may be greater than the sequence number of the last PDCP packet received in-sequence (e.g., RX_DELIV or RX_DELIV-1). For example, the PDCP packet count may be incremented beyond the sequence number of the last PDCP packet received in-sequence.

In some configurations, the processor 110 may be configured to detect a missing PDCP packet based on a comparison of the PDCP packet count and a sequence number of a last PDCP packet received in-sequence (e.g., RX_DELIV or RX_DELIV-1). For example, the processor 110 may execute the layered missing packet detection instructions 112 to detect a missing PDCP packet based on a comparison of the PDCP packet count and a sequence number of a last PDCP packet received in-sequence. In some examples, the processor 110 may be configured to perform the comparison of the PDCP packet count and the sequence number by determining whether the sequence number (e.g., sequence number of the last PDCP packet received in-sequence, RX_DELIV, or RX_DELIV-1) is less than the PDCP packet count. For instance, the processor 110 may detect a layered missing packet in a case that the sequence number (e.g., RX_DELIV or RX_DELIV-1) is less than the PDCP packet count (e.g., PDCP packet count corresponding to RX_NEXT, RX_NEXT-1, VR(R), or VR(R)-1). In some examples, the processor 110 may be configured to perform the comparison of the PDCP packet count and the sequence number by determining whether the PDCP packet count is greater than the sequence number (of the last PDCP packet received in-sequence). For instance, the processor 110 may detect a layered missing packet in a case that the PDCP packet count (e.g., PDCP packet count corresponding to RX_NEXT, RX_NEXT-1, VR(R), or VR(R)-1) is greater than the sequence number (e.g., sequence number of the last PDCP packet received in-sequence, RX_DELIV, or RX_DELIV-1).

In some examples, the wireless communication device 102 may establish communication with multiple bearers. For instance, the processor 110 may be configured to establish communication with a first link, bearer, carrier, and/or RAT and a second link, bearer, carrier, and/or RAT. For example, the first bearer may be an NR bearer and the second bearer may be an LTE bearer. Other combinations of different bearers may be utilized in some examples. In some configurations, the wireless communication device 102 may operate multiple links in accordance with split bearer, dual carrier, and/or multi-RAT approaches. Some of the techniques described herein may be performed in an NR PDCP with LTE-only RLC scenario, in an NR PDCP with NR RLC scenario, in a New Radio Dual Connectivity (NRDC) scenario (e.g., one NR PDCP served by two NR RLCs), in an ENDC scenario, and/or in a split-bearer scenario, etc.

In some configurations, the processor 110 may be configured to determine PDCP packet counts corresponding to multiple links, bearers, carriers, and/or RATs. For instance, the processor 110 may execute the layered missing packet detection instructions 112 to determine respective PDCP packet counts corresponding to multiple (e.g., two, three, or more) links, bearers, carriers, and/or RATs. In some examples, the processor 110 may be configured to determine a PDCP packet count corresponding to a last RLC packet received in-sequence, where the PDCP packet count is associated with a first link, bearer, carrier, and/or RAT. For instance, the PDCP packet count may correspond to an RLC packet received from the first link, bearer, carrier, and/or RAT. In some examples, the processor 110 may be configured to determine a second PDCP packet count corresponding to a second last RLC packet received in-sequence that is associated with a second link, bearer, carrier, and/or RAT.

In some examples, the processor 110 may be configured to detect a layered missing packet based on multiple (e.g., two, three, or more) links, bearers, carriers, and/or RATs. For instance, the processor 110 may execute the layered missing packet detection instructions 112 to detect a layered missing packet based on multiple links, bearers, carriers, and/or RATs. In some examples, the processor 110 may be configured to detect a missing PDCP packet (e.g., missing layered packet) based on a comparison of the PDCP packet count (corresponding to the first link, bearer, carrier, and/or RAT, for instance) and a sequence number of a last PDCP packet received in-sequence (e.g., RX_DELIV or RX_DELIV-1) and based on a second comparison of the second PDCP packet count (corresponding to the second link, bearer, carrier, and/or RAT, for instance) and the sequence number (e.g., RX_DELIV or RX_DELIV-1). For instance, the processor 110 may be configured to perform the comparison of the PDCP packet count and the sequence number by determining whether the sequence number (e.g., RX_DELIV or RX_DELIV-1) is less than the PDCP packet count, and may be configured to perform the comparison of the second PDCP packet count and the sequence number by determining whether the sequence number is less than the second PDCP packet count. In some configurations, one or more comparisons may be performed for one, two, three, or more links, bearers, carriers, and/or RATs for layered missing packet detection. In some examples, comparisons may be performed by determining whether corresponding PDCP packet counts are greater than the sequence number (e.g., RX_DELIV or RX_DELIV-1). In some configurations, the processor 110 may be configured to detect the missing PDCP packet (e.g., layered missing PDCP packet) in a case that the sequence number (e.g., RX_DELIV or RX_DELIV-1) is less than the PDCP packet count (e.g., PDCP packet count corresponding to RX_NEXT or RX_NEXT-1) and the sequence number is less than the second PDCP packet count (e.g., second PDCP packet count corresponding to VR(R) or VR(R)-1).

In some examples, the processor 110 may be configured to perform one or more operations based on a layered missing packet detection (e.g., in response to a layered missing packet detection). For instance, the processor 110 may execute the operation instructions 118 to perform one or more operations to handle the layered missing packet detection. Examples of operations may include stopping a reordering timer, adjusting a sequence number, and/or flushing packets. As described above, a layered missing packet may cause increased memory consumption and/or increased delay for passing packets to an upper layer if left unaddressed.

In some examples, the processor 110 may be configured to stop a PDCP reordering timer (e.g., reset a PDCP reordering timer and/or exit a PDCP reordering procedure) in response to detecting the missing PDCP packet. For instance, the processor 110 may stop and/or reset a PDCP reordering timer that was triggered due to the missing PDCP packet. In some configurations, layered missing packet detection procedures may be triggered based on a PDCP reordering timer. For example, the processor 110 may be configured to trigger the detection based on a PDCP reordering timer. For instance, detection procedures may be performed in response to the start of a PDCP reordering timer or may be performed in response to a threshold time after the start of a PDCP reordering timer. For example, a trigger point for determining whether a PDCP layer is waiting for packets due to a layered missing packet(s) may be based on a fixed timer value (e.g., 2 milliseconds (ms), 3 ms, 5 ms, or more, etc.) from the onset of reordering timer.

In some examples, the processor 110 may be configured to adjust a sequence number in response to detecting the missing PDCP packet (e.g., layered missing packet). For instance, the processor 110 may be configured to adjust the sequence number based on the PDCP packet count in response to detecting the missing PDCP packet. For example, the processor 110 may adjust the sequence number (e.g., sequence number of the last PDCP packet received in-sequence, lower edge of the PDCP receive window, RX_DELIV or RX_DELIV-1) to be equal to the PDCP packet count. In a case of multiple links, bearers, carriers, and/or RATs, the processor 110 may adjust the sequence number (e.g., sequence number of the last PDCP packet received in-sequence, lower edge of the PDCP receive window, RX_DELIV or RX_DELIV-1), to be equal to the lowest PDCP packet count. For instance, the processor 110 may adjust the sequence number to be equal to the lower PDCP packet count of two links, bearers, carriers, and/or RATs.

In some examples, the processor 110 may be configured to flush one or more packets (e.g., to flush one or more packets to an upper layer) in response to detecting the missing PDCP packet (e.g., layered missing packet). For instance, the processor 110 may be configured to flush, to a layer above a PDCP layer, one or more packets in a series of packets up to the PDCP packet count. In a case of multiple links, bearers, carriers, and/or RATs, the processor 110 may flush one or more packets up to the lowest PDCP packet count. In some examples, the processor 110 may flush the one or more packets before a reordering timer expires. For instance, a reordering timer may have an expiration limit (e.g., 500 ms, 1 second, or another value), and the processor 110 may stop the reordering timer and/or flush the one or more packets before the reordering timer reaches expiration in response to detecting a layered missing packet.

In some configurations, the wireless communication device 102 may include one or more elements that are not shown in FIG. 1. For example, the wireless communication device 102 may include one or more displays. A display may be a screen or panel for presenting images. In some examples, the display(s) may be implemented with one or more display technologies, such as liquid crystal display (LCD), light-emitting diode (LED), organic light-emitting diode (OLED), plasma, cathode ray tube (CRT), etc. The display(s) may present content. Examples of content may include one or more interactive controls, graphics, symbols, characters, etc. In some configurations, information, data, and/or images based on received packets (e.g., flushed packets from the PDCP layer) may be presented on the display.

The display(s) may be integrated into the wireless communication device 102 or may be linked to the wireless communication device 102. In some examples, the display(s) may be a monitor with a desktop computer, a display on a laptop, a touch screen on a tablet device, an OLED panel in a smartphone, etc. In another example, the wireless communication device 102 may be a virtual reality headset with integrated displays. In another example, the wireless communication device 102 may be a computer that is coupled to a virtual reality headset with the displays.

In some configurations, the wireless communication device 102 may present a user interface on the display. For example, the user interface may enable a user to interact with the wireless communication device 102. In some configurations, the display may be a touchscreen that receives input from physical touch (by a finger, stylus, or other tool, for example). Additionally or alternatively, the wireless communication device 102 may include or be coupled to another input interface. For example, the wireless communication device 102 may include a camera and may detect user gestures (e.g., hand gestures, arm gestures, eye tracking, eyelid blink, etc.). In another example, the wireless communication device 102 may be linked to a mouse and may detect a mouse click. In another example, the wireless communication device 102 may be linked to a keyboard and may detect keyboard input. In yet another example, the wireless communication device 102 may be linked to one or more other controllers (e.g., game controllers, joy sticks, touch pads, motion sensors, etc.) and may detect input from the one or more controllers. In some examples, the wireless communication device 102 may utilize input received with the input interface to request content (e.g., downlink packets) from one or more network devices (e.g., base station(s), access point(s), and/or electronic device(s), etc.). For instance, the wireless communication device 102 (e.g., processor 110) may request content from a website, server, network, etc., based on a received user input.

Figure 2:
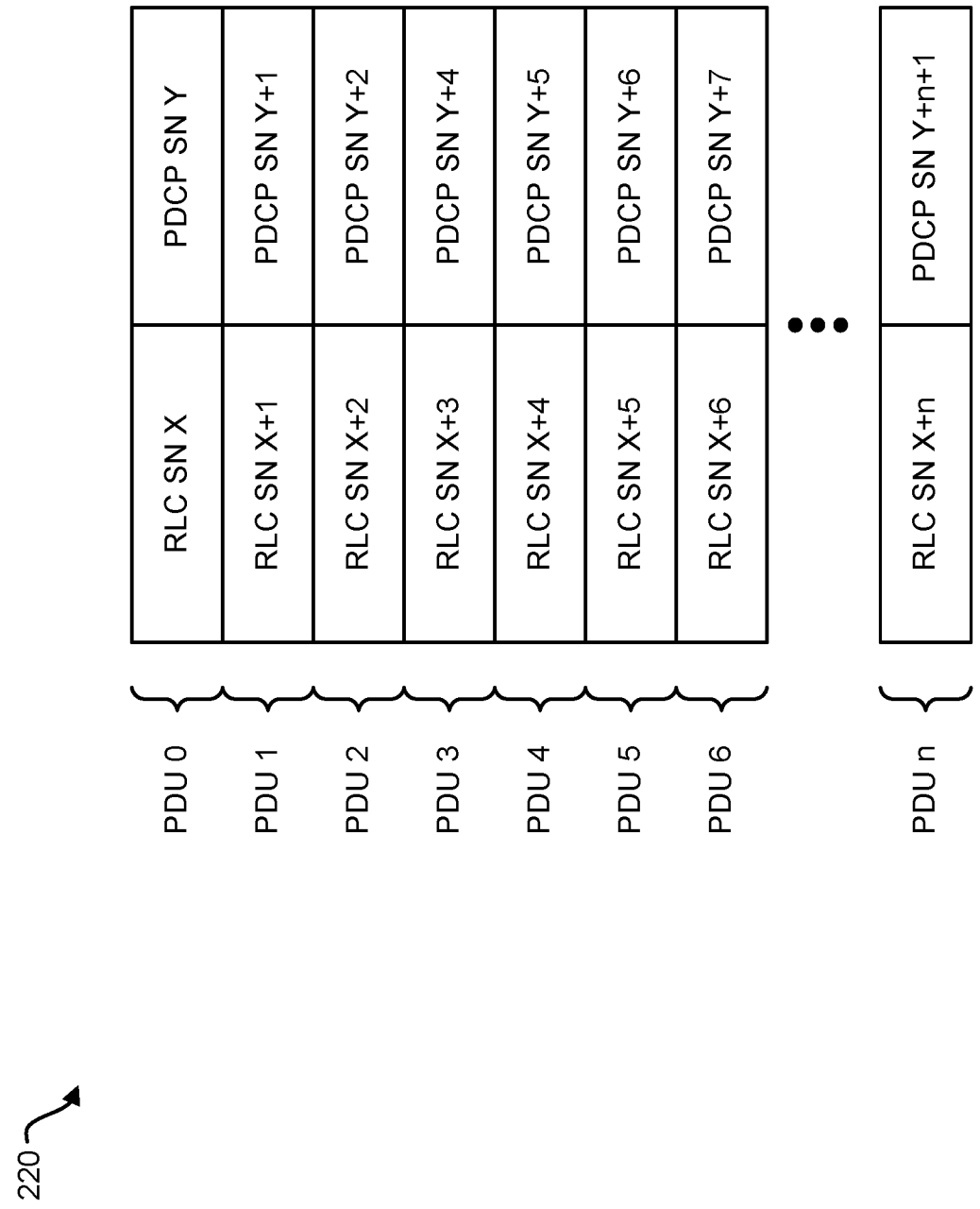
FIG. 2 is a diagram illustrating an example of packets.

FIG. 2 is a diagram illustrating an example of packets 220. In particular, FIG. 2 illustrates an example of PDU 0-n corresponding to RLC packets and PDCP packets in a network transmission scenario. In FIG. 2, "sequence number" is abbreviated as "SN." FIG. 2 also shows an example of an initial RLC sequence number X and an example of an initial PDCP sequence number Y.

The scenario illustrated in FIG. 2 may occur when a network (e.g., base station(s), network device(s), etc.) incurs a missing PDCP sequence number and not a corresponding missing RLC sequence number in data transmission. If unaddressed, the scenario in FIG. 2 may result in one or more of the following impacts to a receiving device (e.g., UE). In some approaches, a PDCP reordering timer may be started once PDCP sequence number (Y+4) is received at a wireless communication device. For example, the PDCP reordering timer may be started to recover a missing PDCP packet corresponding to PDCP sequence number (Y+3) through RLC ARQ before the PDCP reordering timer expires. However, the PDCP reordering timer may not be accompanied by an RLC reassembly timer in this scenario. This is due to the RLC sequence numbers being sent in-sequence (e.g., without holes) by the network. This may result in a wireless communication device (e.g., UE) not utilizing the RLC ARQ procedure and in the PDCP layer waiting for a packet that will not be transmitted by the network.

Figure 3:
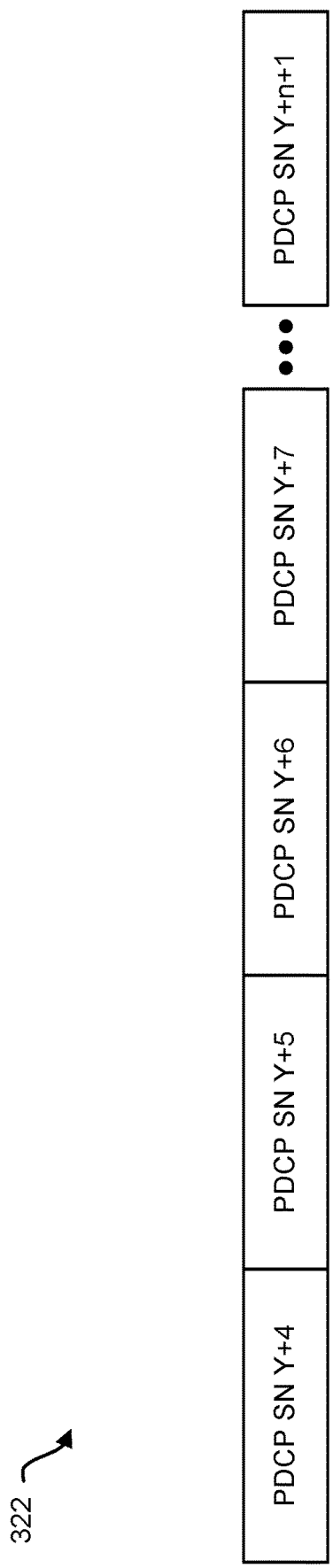
FIG. 3 is a diagram illustrating an example of a packet data convergence protocol (PDCP) reordering window.

FIG. 3 is a diagram illustrating an example of a PDCP reordering window 322. For example, the PDCP reordering window 322 may be an example of a buffer for reordering PDCP packets while a reordering timer is running. In FIG. 3, "sequence number" is abbreviated as "SN." FIG. 3 illustrates an example of buffering that may occur in the scenario described in relation to FIG. 2, if left unaddressed. In FIG. 3, the PDCP reordering window 322 may store PDCP packets with sequence numbers Y+4 to Y+n+1 while waiting for the PDCP packet with sequence Y+3 (while the PDCP reordering timer is running).

The PDCP reordering timer procedure initiated in this case may result in storing newly received in-sequence data (e.g., PDCP packets) in the PDCP reordering window 322 until the reordering timer expires. This may have an adverse effect on memory (e.g., wireless communication device memory, UE memory) in high throughput scenarios. For example, memory may store all the newly received PDCP packets in the reordering window 322 and/or the round-trip-time (RTT) of the PDCP packets waiting in the PDCP reordering window 322 may increase. One or more of these problems may also occur in dual connectivity scenarios, where a single PDCP entity may be served by more than one RLC entity.

Figure 4:
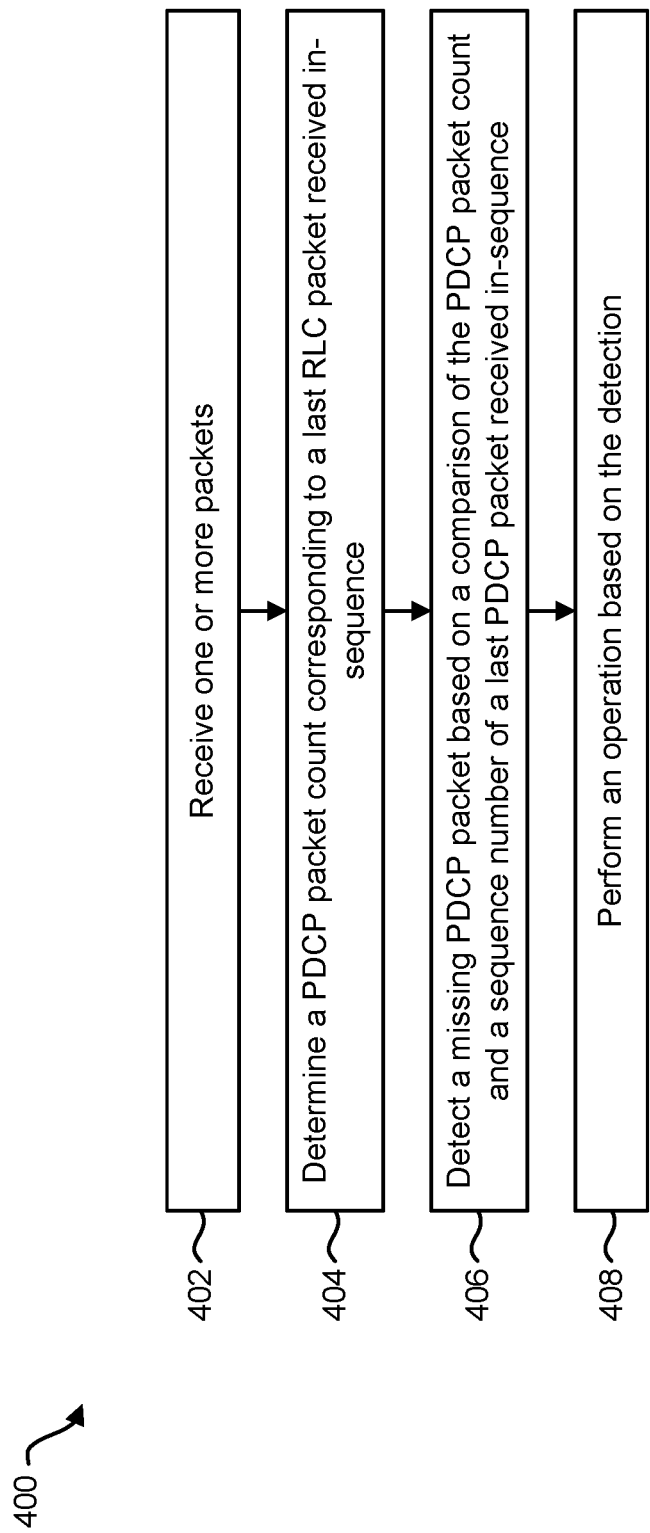
FIG. 4 is a flow diagram illustrating an example of a method for layered missing packet detection.

FIG. 4 is a flow diagram illustrating an example of a method 400 for layered missing packet detection. In some examples, the method 400 may be performed by a wireless communication device (e.g., the wireless communication device 102 described in relation to FIG. 1).

A wireless communication device may receive 402 one or more packets. This may be accomplished as described above in relation to FIG. 1 in some configurations. For example, the wireless communication device may receive one or more packets from one or more links (e.g., link(s), bearer(s), carrier(s), and/or RAT(s)) using one or more antennas and/or one or more transceivers. The received packet(s) (e.g., PHY layer packet(s)) may include RLC packets and/or PDCP packets.

The wireless communication device may determine 404 a PDCP packet count corresponding to a last RLC packet received in-sequence. This may be accomplished as described in relation to FIG. 1 in some configurations. For instance, the wireless communication device may determine the PDCP count at the PDCP layer using the PDCP sequence number (e.g., the PDCP layer may provide the PDCP count value for a packet to the RLC layer to enable the RLC layer to infer the PDCP packet count). In some examples, the wireless communication device may increment a PDCP packet count for each RLC packet that is received in-sequence. In some approaches, the wireless communication device may determine a PDCP packet count relative to an RLC variable. For example, the wireless communication device may determine a PDCP packet count corresponding to a variable RX_NEXT or RX_NEXT-1 in a case that the bearer is an NR bearer, or corresponding to a variable VR(R) or VR(R)-1 in a case that the bearer is an LTE bearer. In some examples, a PDCP packet count relative to RX_NEXT (e.g., RX_NEXT-1) or VR(R) (e.g., VR(R)-1) may be obtained by examining a PDCP header included in an RLC service data unit (SDU). For instance, the relationship between the RLC sequence number and PDCP packet count may be established by examining the SDU's PDCP header for the respective RLC sequence number. In some approaches, the relationship between the RLC sequence number and the PDCP packet count may be performed and/or determined on a per-packet basis.

The wireless communication device may detect 406 a missing PDCP packet (e.g., layered missing packet) based on a comparison of the PDCP packet count and a sequence number of a last PDCP packet received in-sequence (e.g., RX_DELIV or RX_DELIV-1). This may be accomplished as described in relation to FIG. 1 in some configurations. For example, the wireless communication device (e.g., processor) may determine whether the sequence number (e.g., RX_DELIV-1) is less than the PDCP packet count.

The wireless communication device may perform 408 an operation based on the detection. This may be accomplished as described in relation to FIG. 1 in some configurations. For example, the wireless communication device may stop a reordering timer (e.g., PDCP reordering timer), may adjust the sequence number (e.g., RX_DELIV), and/or may flush packets (e.g., packets up to the PDCP packet count).

In some examples, one or more of the functions, procedures, and/or operations described herein may be performed at an RLC layer and/or at a PDCP layer. For example, a wireless communication device (e.g., processor) may perform layered missing packet detection at an RLC layer by determining a PDCP packet count corresponding to a lower edge of an RLC receive window (e.g., RX_NEXT, RX_NEXT-1, VR(R), or VR(R)-1) by extracting a PDCP sequence number from a RLC SDU that moved the lower edge of the RLC receive window, and/or by comparing the PDCP packet count to a lower edge of a PDCP receive window (e.g., RX_DELIV or RX_DELIV-1). In some examples, a wireless communication device (e.g., processor) may stop a reordering timer (e.g., PDCP reordering timer), may adjust the sequence number (e.g., RX_DELIV), and/or may flush packets (e.g., packets up to the PDCP packet count) at the PDCP layer.

Figure 5:
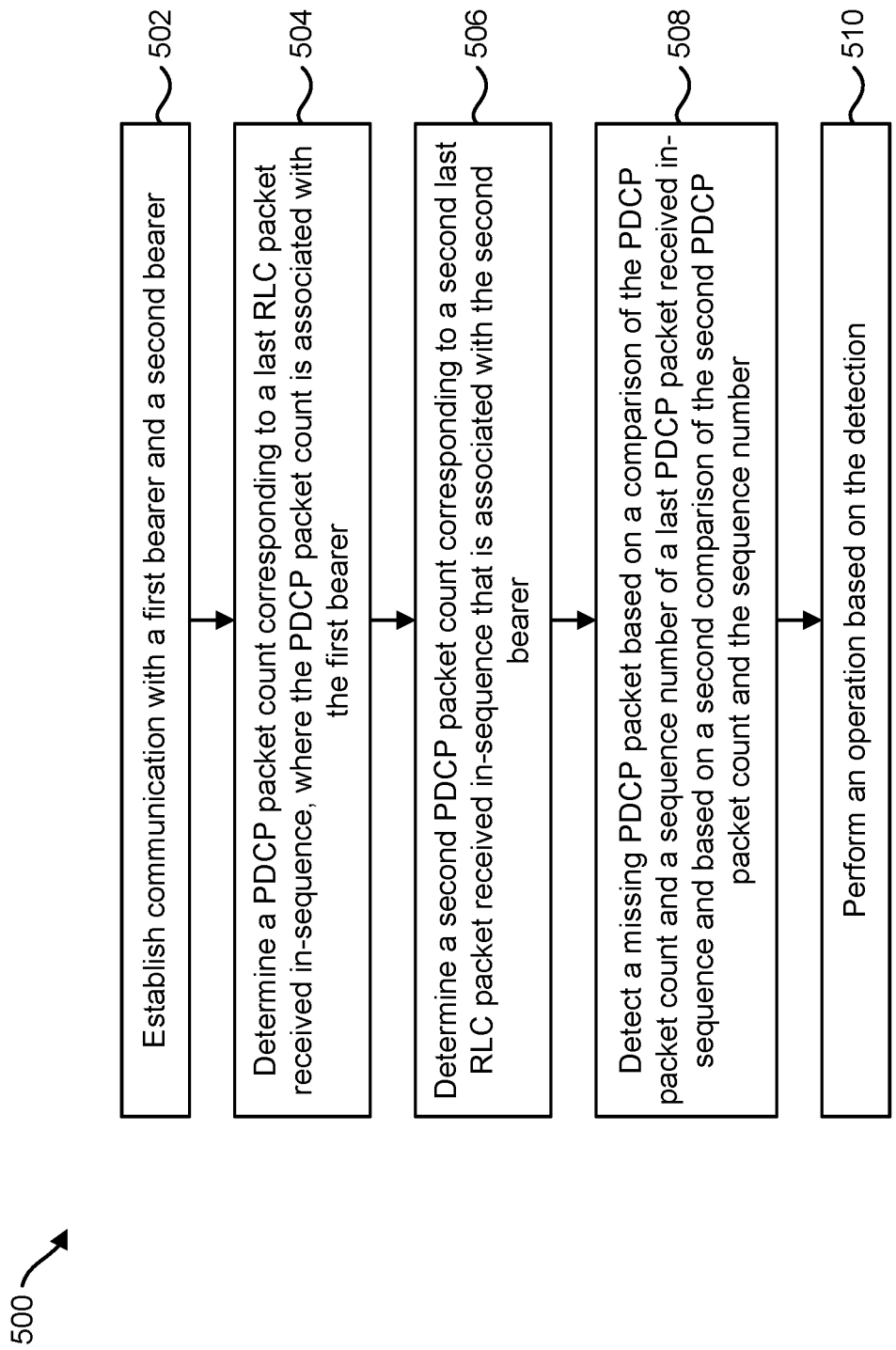
FIG. 5 is a flow diagram illustrating another example of a method for layered missing packet detection.

FIG. 5 is a flow diagram illustrating another example of a method 500 for layered missing packet detection. In some examples, the method 500 may be performed by a wireless communication device (e.g., the wireless communication device 102 described in relation to FIG. 1).

A wireless communication device may establish 502 communication with a first bearer and a second bearer. This may be accomplished as described above in relation to FIG. 1 in some configurations. For example, the wireless communication device may send signals to and/or receive signals from a first bearer and a second bearer. For instance, the wireless communication device may request data to be delivered by the first bearer and the second bearer. One or more network devices (e.g., base stations, access points, etc.) may allocate communication resources (e.g., frequency, temporal, spatial, etc., resources) to send packets (e.g., PDCP packets) to the wireless communication device. In some configurations, one PDCP entity may be served by multiple RLC entities. For example, a sequence of PDCP packets may be sent to the wireless communication device through different bearers.

The wireless communication device may determine 504 a PDCP packet count corresponding to a last RLC packet received in-sequence, where the PDCP packet count is associated with the first bearer. This may be accomplished as described in relation to FIG. 1 in some configurations. For example, the wireless communication device may determine a PDCP packet count based on RLC packets (e.g., RLC packet sequence number(s)) from the first bearer. In some approaches, the wireless communication device may determine the PDCP packet count based on a variable (e.g., RX_NEXT or RX_NEXT-1) in a case that the bearer is an NR bearer.

The wireless communication device may determine 506 a second PDCP packet count corresponding to a second last RLC packet received in-sequence that is associated with the second bearer. This may be accomplished as described in relation to FIG. 1 in some configurations. For example, the wireless communication device may determine a PDCP packet count based on RLC packets (e.g., RLC packet sequence number(s)) from the second bearer. In some approaches, the wireless communication device may determine the PDCP packet count based on a variable (e.g., VR(R) or VR(R)-1) in a case that the second bearer is an LTE bearer.

The wireless communication device may detect 508 a missing PDCP packet (e.g., layered missing packet) based on a comparison of the PDCP packet count and a sequence number of a last PDCP packet received in-sequence (e.g., RX_DELIV or RX_DELIV-1) and based on a second comparison of the second PDCP packet count and the sequence number. This may be accomplished as described in relation to FIG. 1 in some configurations. For example, the wireless communication device (e.g., processor) may determine whether the sequence number (e.g., RX_DELIV or RX_DELIV-1) is less than the PDCP packet count and is less than the second PDCP packet count. In a case that the sequence number is less than the PDCP packet count and is less than the second PDCP packet count, a missing PDCP packet (e.g., layered missing packet, PDCP "hole" from the network, etc.) may be detected. In another example, the wireless communication device (e.g., processor) may determine whether the PDCP packet count and the second PDCP packet count are greater than the sequence number (e.g., RX_DELIV or RX_DELIV-1). In a case that the PDCP packet count and the second PDCP packet count are greater than the sequence number, a missing PDCP packet (e.g., layered missing packet, PDCP "hole" from the network, etc.) may be detected.

The wireless communication device may perform 510 an operation based on the detection. This may be accomplished as described in relation to FIG. 1 in some configurations. For example, the wireless communication device may stop a reordering timer (e.g., PDCP reordering timer), may adjust the sequence number (e.g., RX_DELIV) to the lower of the PDCP packet count (e.g., (PDCP packet count value of RX_NEXT-1)+1) and the second PDCP packet count (e.g., (PDCP packet count value of VR(R)-1)+1), and/or may flush packets (e.g., packets up to the lower of the PDCP packet count and the second PDCP packet count).

Figure 6:
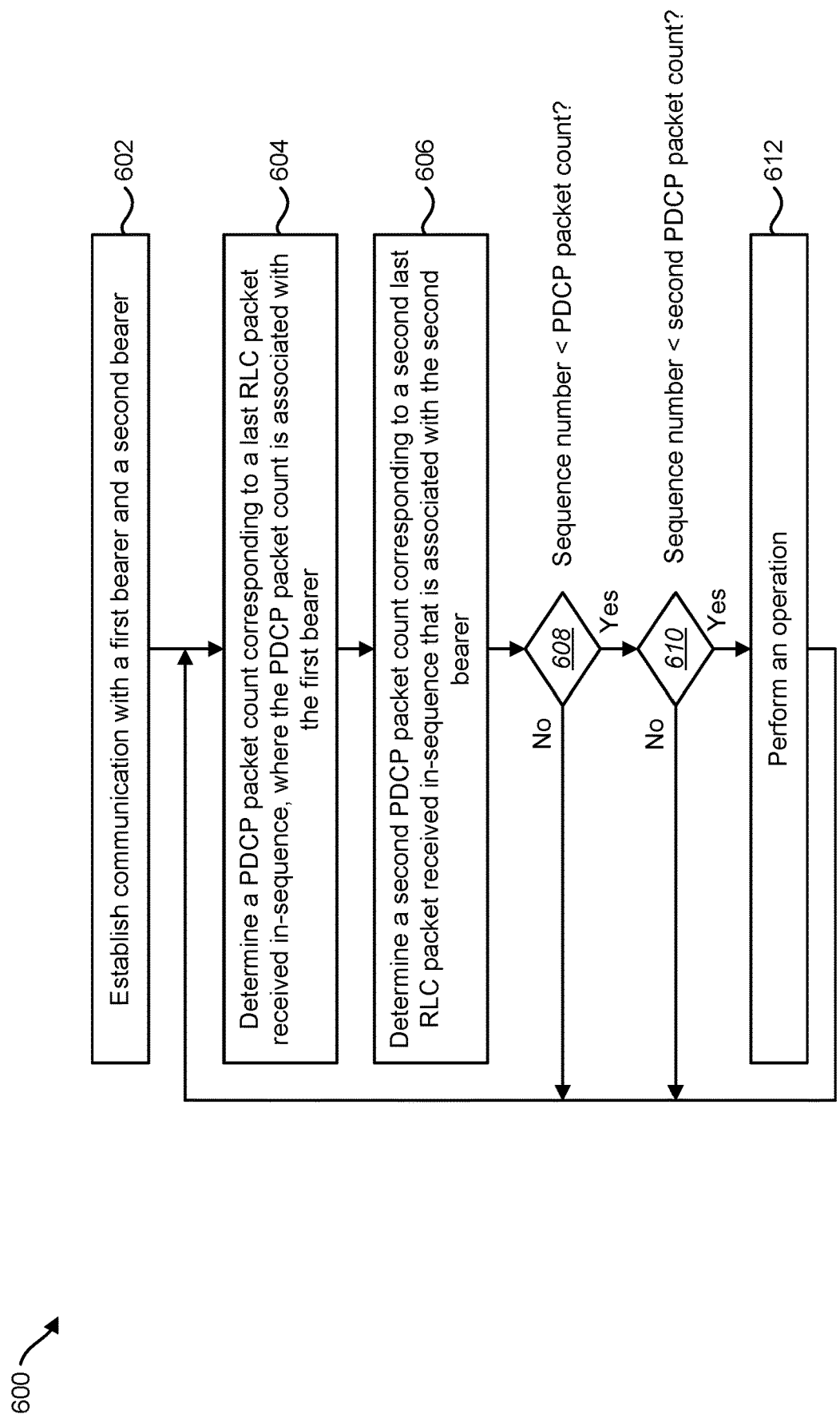
FIG. 6 is a flow diagram illustrating another example of a method for layered missing packet detection.

FIG. 6 is a flow diagram illustrating another example of a method 600 for layered missing packet detection. In some examples, the method 600 may be performed by a wireless communication device (e.g., the wireless communication device 102 described in relation to FIG. 1). In some configurations, the method 600 may be performed for PDCP sequence number hole detection for an ENDC scenario.

A wireless communication device may establish 602 communication with a first bearer and a second bearer. This may be accomplished as described above in relation to FIG. 1 and/or FIG. 5 in some configurations.

The wireless communication device may determine 604 a PDCP packet count corresponding to a last RLC packet received in-sequence, where the PDCP packet count is associated with the first bearer. This may be accomplished as described in relation to FIG. 1 and/or FIG. 5 in some configurations.

The wireless communication device may determine 606 a second PDCP packet count corresponding to a second last RLC packet received in-sequence that is associated with the second bearer. This may be accomplished as described in relation to FIG. 1 and/or FIG. 5 in some configurations.

The wireless communication device may determine 608 whether the sequence number (e.g., RX_DELIV or RX_DELIV-1) is less than the PDCP packet count. This may be accomplished as described in relation to FIG. 1 and/or FIG. 5. For instance, the wireless communication device may compare the sequence number to the PDCP packet count to determine whether the sequence number is a smaller value relative to the PDCP packet count. In a case that the sequence number is not less than (e.g., is greater than or equal to) the PDCP packet count, operation may return to determining 604 the PDCP packet count and so on for one or more subsequent packets.

In a case that the sequence number is less than the PDCP packet count, the wireless communication device may determine 610 whether the sequence number (e.g., RX_DELIV or RX_DELIV-1) is less than the second PDCP packet count. This may be accomplished as described in relation to FIG. 1 and/or FIG. 5. For instance, the wireless communication device may compare the sequence number to the second PDCP packet count to determine whether the sequence number is a smaller value relative to the second PDCP packet count. In a case that the sequence number is not less than (e.g., is greater than or equal to) the second PDCP packet count, operation may return to determining 604 the PDCP packet count and so on for one or more subsequent packets.

In a case that the sequence number is less than the second PDCP packet count (e.g., in a case of layered missing packet detection), the wireless communication device may perform 612 an operation based on the detection. This may be accomplished as described in relation to FIG. 1 and/or FIG. 5 in some configurations. For example, the wireless communication device may stop a reordering timer (e.g., PDCP reordering timer), may adjust the sequence number (e.g., RX_DELIV) to the lower of the PDCP packet count and the second PDCP packet count, and/or may flush packets (e.g., packets up to the lower of the PDCP packet count and the second PDCP packet count).

Figure 7:
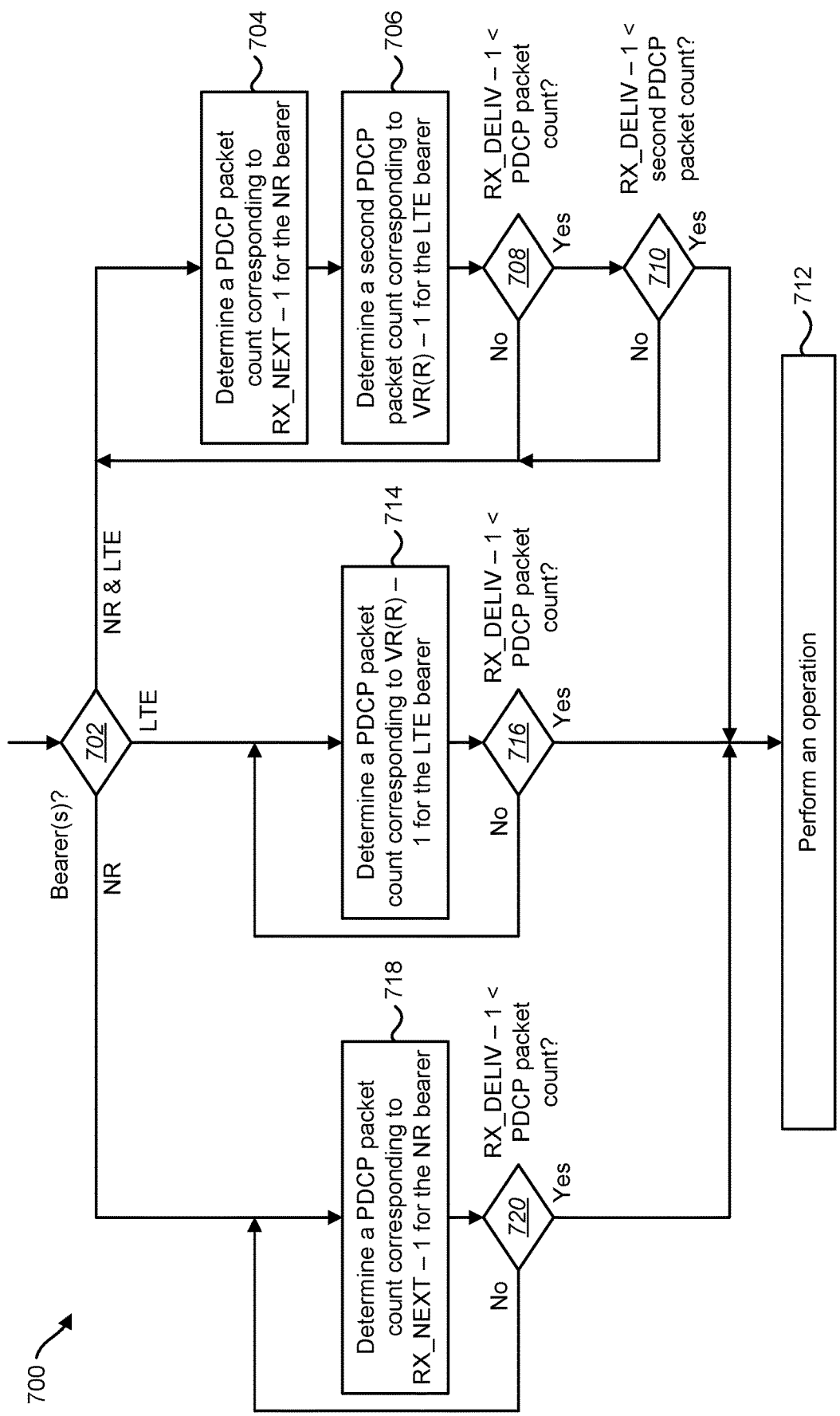
FIG. 7 is a flow diagram illustrating another example of a method for layered missing packet detection.

FIG. 7 is a flow diagram illustrating another example of a method 700 for layered missing packet detection. In some examples, the method 700 may be performed by a wireless communication device (e.g., the wireless communication device 102 described in relation to FIG. 1).

A wireless communication device may determine 702 a bearer or bearers. For example, the wireless communication device may determine 702 whether an NR bearer, an LTE bearer, or an NR and LTE bearers are utilized for communication. For instance, the wireless communication device may look up one or more bearers that are currently being utilized by the wireless communication device. In some examples, the wireless communication device may read a record from memory that indicates one or more bearers that are in use for communication.

In a case that NR and LTE bearers are utilized, the wireless communication device may determine 704 a PDCP packet count corresponding to RX_NEXT-1 for the NR bearer. This may be accomplished as described in relation to one or more of FIGS. 1 and/or 4-6 in some configurations. For example, at the receiver side, one or more RLC entities may maintain and/or track a PDCP packet count corresponding to a lower edge of the RLC receive window (e.g., RX_NEXT-1 in the case of NR) along with associated state information.

The wireless communication device may determine 706 a second PDCP packet count corresponding to VR(R)-1 for the LTE bearer. This may be accomplished as described in relation to one or more of FIGS. 1 and/or 4-6 in some configurations. For example, at the receiver side, one or more RLC entities may maintain and/or track a PDCP packet count corresponding to a lower edge of the RLC receive window (e.g., VR(R)-1 in the case of LTE) along with associated state information. When the RLC packets and PDCP packets are received in-sequence, the last submitted PDCP PDU to an upper layer (e.g., RX_DELIV-1) may be greater than or equal to the current PDCP packet count corresponding to one or more RLCs (e.g., RX_NEXT-1 in a case of NR RLC or VR(R)-1 in a case of LTE RLC).

The wireless communication device may determine 708 whether RX_DELIV-1 is less than the PDCP packet count (associated with RX_NEXT-1 of an RLC in the case of NR, for example). This may be accomplished as described in relation to one or more of FIGS. 1 and/or 4-6. For instance, the wireless communication device may compare RX_DELIV-1 to the PDCP packet count for the NR bearer (e.g., corresponding to RX_NEXT-1). In a case that RX_DELIV-1 is not less than (e.g., is greater than or equal to) the PDCP packet count, operation may return to determining 704 the PDCP packet count and so on for one or more subsequent packets.

In a case that RX_DELIV-1 is less than the PDCP packet count, the wireless communication device may determine 710 whether RX_DELIV-1 is less than the second PDCP packet count (associated with VR(R)-1 of an RLC in the case of LTE, for example). This may be accomplished as described in relation to one or more of FIGS. 1 and/or 4-6. For instance, the wireless communication device may compare RX_DELIV-1 to the second PDCP packet count for the LTE bearer (e.g., corresponding to VR(R)). In a case that RX_DELIV-1 is not less than (e.g., is greater than or equal to) the second PDCP packet count, operation may return to determining 704 the PDCP packet count and so on for one or more subsequent packets.

In a case that RX_DELIV-1 is less than the second PDCP packet count, the wireless communication device may detect a missing PDCP packet. For instance, the wireless communication device may detect that the network (e.g., gNB, eNB, etc.) has transmitted data with one or more PDCP sequence number holes, while the RLCs' sequence numbers are sequential. In the case that RX_DELIV-1 is less than the second PDCP packet count, the wireless communication device may perform 712 an operation based on the detection. This may be accomplished as described in relation to one or more of FIGS. 1 and/or 4-6 in some configurations. For example, the wireless communication device may stop a reordering timer (e.g., PDCP reordering timer), may adjust the sequence number (e.g., RX_DELIV) to the lower of the PDCP packet count and the second PDCP packet count, and/or may flush packets (e.g., packets up to the lower of the PDCP packet count and the second PDCP packet count).

In a case that an LTE bearer is utilized, the wireless communication device may determine 714 a PDCP packet count corresponding to VR(R)-1 for the LTE bearer. This may be accomplished as described in relation to one or more of FIGS. 1 and/or 4-6 and/or element 706 in some configurations.

The wireless communication device may determine 716 whether RX_DELIV-1 is less than the PDCP packet count (associated with VR(R)-1 of an RLC in the case of LTE, for example). This may be accomplished as described in relation to one or more of FIGS. 1 and/or 4-6 and/or element 710. In a case that RX_DELIV-1 is not less than (e.g., is greater than or equal to) the PDCP packet count, operation may return to determining 714 the PDCP packet count and so on for one or more subsequent packets.

In a case that RX_DELIV-1 is less than the second PDCP packet count, the wireless communication device may detect a missing PDCP packet. For example, the wireless communication device may detect that the network (e.g., gNB, eNB, etc.) has transmitted data with one or more PDCP sequence number holes, while the RLCs' sequence numbers are sequential. In the case that RX_DELIV-1 is less than the PDCP packet count, the wireless communication device may perform 712 an operation based on the detection.

In a case that an NR bearer is utilized, the wireless communication device may determine 718 a PDCP packet count corresponding to RX_NEXT-1 for the NR bearer. This may be accomplished as described in relation to one or more of FIGS. 1 and/or 4-6 and/or element 704 in some configurations.

The wireless communication device may determine 720 whether RX_DELIV-1 is less than the PDCP packet count (associated with RX_NEXT-1 of an RLC in the case of NR, for example). This may be accomplished as described in relation to one or more of FIGS. 1 and/or 4-6 and/or element 708. In a case that RX_DELIV-1 is not less than (e.g., is greater than or equal to) the PDCP packet count, operation may return to determining 718 the PDCP packet count and so on for one or more subsequent packets.

In a case that RX_DELIV-1 is less than the PDCP packet count, the wireless communication device may detect a missing PDCP packet. For example, the wireless communication device may detect that the network (e.g., gNB, eNB, etc.) has transmitted data with one or more PDCP sequence number holes, while the RLCs' sequence numbers are sequential. In the case that RX_DELIV-1 is less than the PDCP packet count, the wireless communication device may perform 712 an operation based on the detection. In some examples, the method 700 and/or elements of the method 700 may be repeated. For instance, the method 700 and/or steps of the method 700 may be repeated for one or more subsequent packets.

In some examples, a wireless communication device may perform the method 700 in response to a change in bearer. For instance, if a change in bearer occurs (e.g., a bearer is added, a bearer is dropped, a bearer is changed, etc.), the wireless communication device may return to determining 702 a bearer or bearers.

Figure 8:
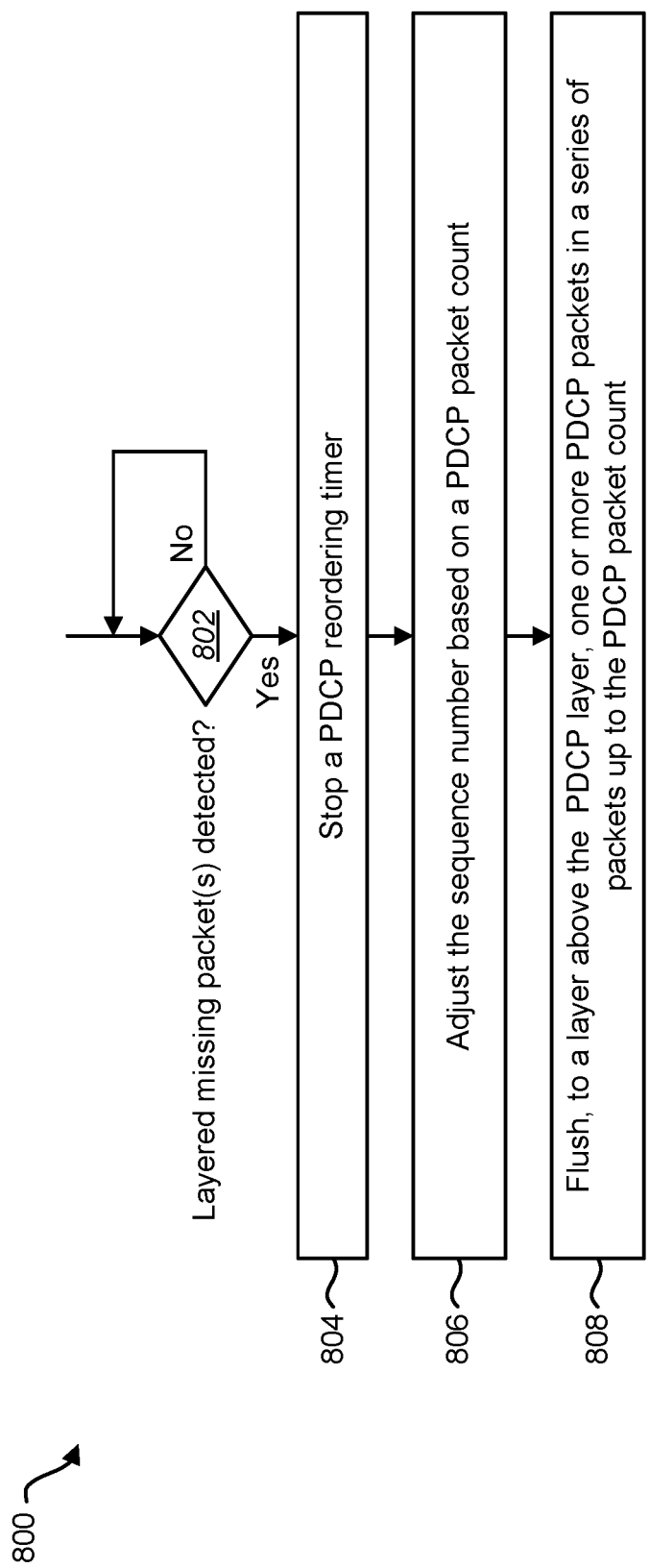
FIG. 8 is a flow diagram illustrating an example of a method for handling a layered missing packet.

FIG. 8 is a flow diagram illustrating an example of a method 800 for handling a layered missing packet. In some examples, the method 800 may be performed by a wireless communication device (e.g., the wireless communication device 102 described in relation to FIG. 1).

A wireless communication device may determine 802 whether one or more layered missing packets are detected. This may be accomplished as described above in relation to one or more of FIGS. 1 and/or 4-7. In a case that one or more layered missing packets are not detected, operation may return to determining 802 whether one or more layered missing packets are detected for one or more subsequent packets.

In a case that one or more layered missing packets are detected, the wireless communication device may stop 804 a PDCP reordering timer in response to detecting the layered missing packet(s). This may be accomplished as described above in relation to one or more of FIGS. 1 and/or 4-7. For example, at a receiver side, when the missing PDCP packet in network transmission is detected, the PDCP layer may cease waiting for missed packets and/or may exit a reordering timer running procedure.

The wireless communication device may adjust 806 the sequence number based on a PDCP packet count. This may be accomplished as described above in relation to one or more of FIGS. 1 and/or 4-7. For example, the wireless communication device (e.g., PDCP entity) may move a PDCP receive window to align with the RLC receive window. In some approaches, aligning the windows may be achieved by moving the RX_DELIV (e.g., lower edge of PDCP receive window) to the (PDCP packet count value of the NR RLC's RX_NEXT-1)+1 and/or to the (PDCP packet count of LTE RLC's VR(R)-1)+1, whichever is lower. In case of NR dual connectivity, a lowest PDCP packet count of a master cell group (MCG) RLC or a secondary cell group (SCG) RLC may be maintained.

The wireless communication device may flush 808, to a layer (e.g., radio resource control (RRC), application layer, etc.) above the PDCP layer, one or more PDCP packets in a series of packets up to the PDCP packet count. This may be accomplished as described above in relation to one or more of FIGS. 1 and/or 4-7. In some examples, a higher layer (e.g., application layer) may handle the missing packet (e.g., ARQ may not be performed at the PDCP layer and/or at the RLC layer for the layered missing packet). For instance, an application layer may handle the missing packet (e.g., request retransmission) using a transmission control protocol (TCP).

In some examples, performing one or more of the operations described in relation to FIG. 8 may reduce memory consumption on a receiving device (e.g., the wireless communication device) when a layered missing packet occurs. For example, the wireless communication device may be benefited by avoiding some memory consumption until the PDCP reordering timer expires and/or may be benefited by reducing the latency in packet delivery.

Figure 9:
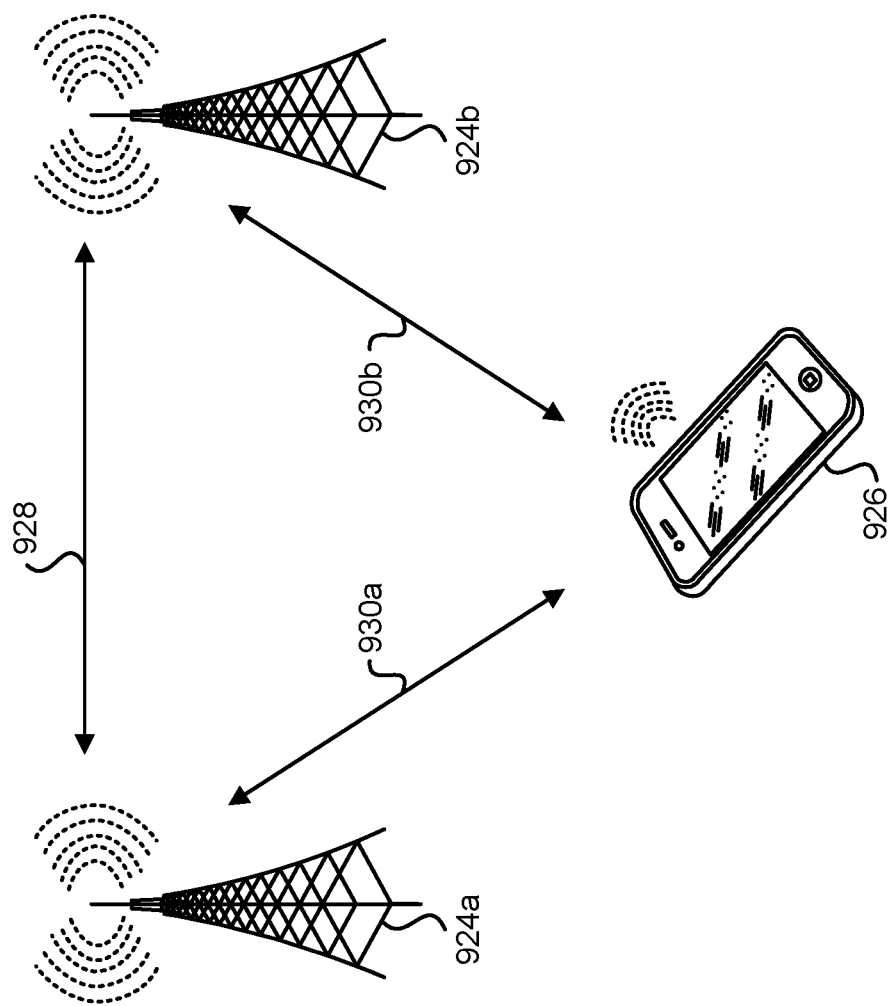
FIG. 9 is a diagram illustrating an example of network devices and a wireless communication device.

FIG. 9 is a diagram illustrating an example of network devices 924*a-b* and a wireless communication device 926. The wireless communication device 926 may be an example of the wireless communication device 102 described in relation to FIG. 1. The network devices 924*a-b* (e.g., base stations, access points, gateways, eNB(s), and/or gNB(s), etc.) may provide communication with multiple links, bearers, carriers, and/or RATs. In the example of FIG. 9, the wireless communication device 926 communicates with the network devices 924*a-b* using a first link 930*a* and a second link 930*b*. The links 930*a-b* may be examples of (and/or may correspond to) links, bearers, carriers, and/or RATs (e.g., cellular, WLAN, and/or PAN, etc.).

In some cases, the network devices 924*a-b* may communicate using a link 928 (e.g., a wired and/or wireless link), and may allocate different PDCP packets to each network device 924*a-b* for delivery to the wireless communication device 926. In some cases, one or more PDCP packets may be lost when being communicated via the link 928, while RLC packets may be communicated without loss via the links 930a-b. In some cases, one or more PDCP packets may be numbered incorrectly by one or more of the network devices 924a-b. Each of these scenarios may result in a layered missing packet and/or a sequence number hole as described herein. In some examples, the wireless communication device 926 may detect the layered missing packet and/or sequence number hole as described herein. The wireless communication device 926 may perform one or more operations to reduce memory impact in a layered missing packet and/or sequence number hole scenario. For instance, some configurations of the systems and methods described herein may be utilized to detect a PDCP sequence number hole in eNB/gNB transmissions and/or to reduce memory consumption on a receiving device (e.g., wireless communication device).

Figure 10:
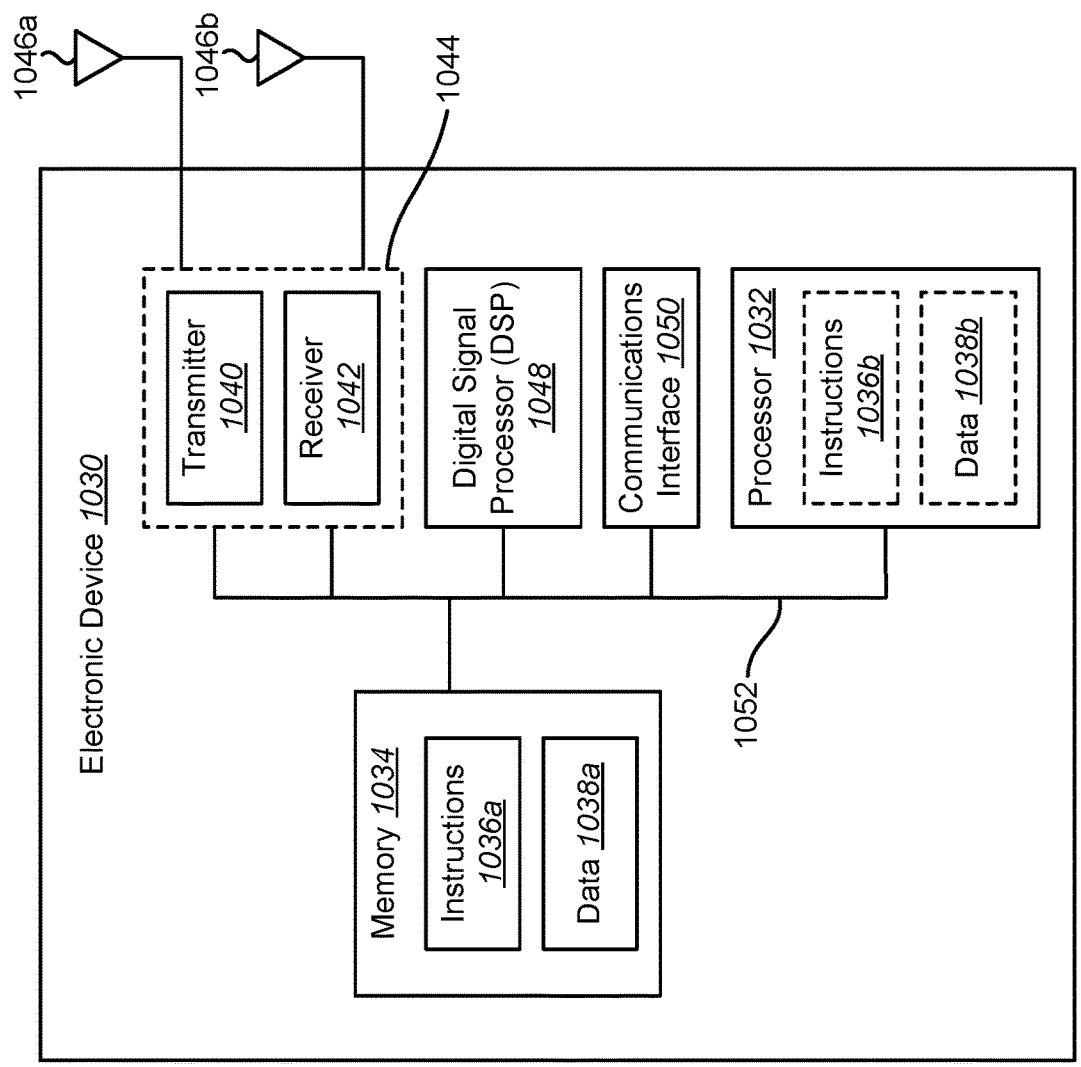
FIG. 10 illustrates certain components that may be included within an electronic device configured to implement various configurations of the systems and methods disclosed herein for layered missing packet detection and/or handling.

FIG. 10 illustrates certain components that may be included within an electronic device 1030 configured to implement various configurations of the systems and methods disclosed herein for layered missing packet detection and/or handling. The electronic device 1030 may be an access terminal, a mobile station, a user equipment (UE), a smartphone, a digital camera, a video camera, a tablet device, a laptop computer, a desktop computer, a server, etc. The electronic device 1030 may be implemented in accordance with one or more of the wireless communication devices (e.g., wireless communication device 102) described herein.

The electronic device 1030 includes a processor 1032. The processor 1032 may be a general purpose single- or multi-chip microprocessor (e.g., an ARM), a special purpose microprocessor (e.g., a digital signal processor (DSP)), a microcontroller, a programmable gate array, etc. The processor 1032 may be referred to as a central processing unit (CPU) and/or a modem processor. Although a single processor 1032 is shown in the electronic device 1030, in an alternative configuration, a combination of processors (e.g., an ARM and DSP) could be implemented.

The electronic device 1030 also includes memory 1034. The memory 1034 may be any electronic component capable of storing electronic information. The memory 1034 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof.

Data 1038a and instructions 1036a may be stored in the memory 1034. The instructions 1036a may be executable by the processor 1032 to implement one or more of the methods described herein. Executing the instructions 1036a may involve the use of the data 1038a that is stored in the memory 1034. When the processor 1032 executes the instructions 1036, various portions of the instructions 1036b may be loaded onto the processor 1032 and/or various pieces of data 1038b may be loaded onto the processor 1032. In some configurations, the instructions 1036 may be executable to implement and/or perform one or more of the methods 400, 500, 600, 700, 800, and/or one or more of the functions, procedures, and/or operations described herein (e.g., operations described in relation to FIG. 1 and/or FIG. 11, etc.).

The electronic device 1030 may also include a transmitter 1040 and a receiver 1042 to allow transmission and reception of signals to and from the electronic device 1030. The transmitter 1040 and receiver 1042 may be collectively referred to as a transceiver 1044. One or more antennas 1046a-b may be electrically coupled to the transceiver 1044. The electronic device 1030 may also include (not shown) multiple transmitters, multiple receivers, multiple transceivers, and/or additional antennas.

The electronic device 1030 may include a digital signal processor (DSP) 1048. The electronic device 1030 may also include a communications interface 1050. The communications interface 1050 may allow and/or enable one or more kinds of input and/or output. For example, the communications interface 1050 may include one or more ports and/or communication devices for linking other devices to the electronic device 1030. In some configurations, the communications interface 1050 may include the transmitter 1040, the receiver 1042, or both (e.g., the transceiver 1044). Additionally or alternatively, the communications interface 1050 may include one or more other interfaces (e.g., touchscreen, keypad, keyboard, microphone, camera, etc.). For example, the communication interface 1050 may enable a user to interact with the electronic device 1030.

The various components of the electronic device 1030 may be coupled together by one or more buses, which may include a power bus, a control signal bus, a status signal bus, a data bus, etc. For the sake of clarity, the various buses are illustrated in FIG. 10 as a bus system 1052.

Figure 11:
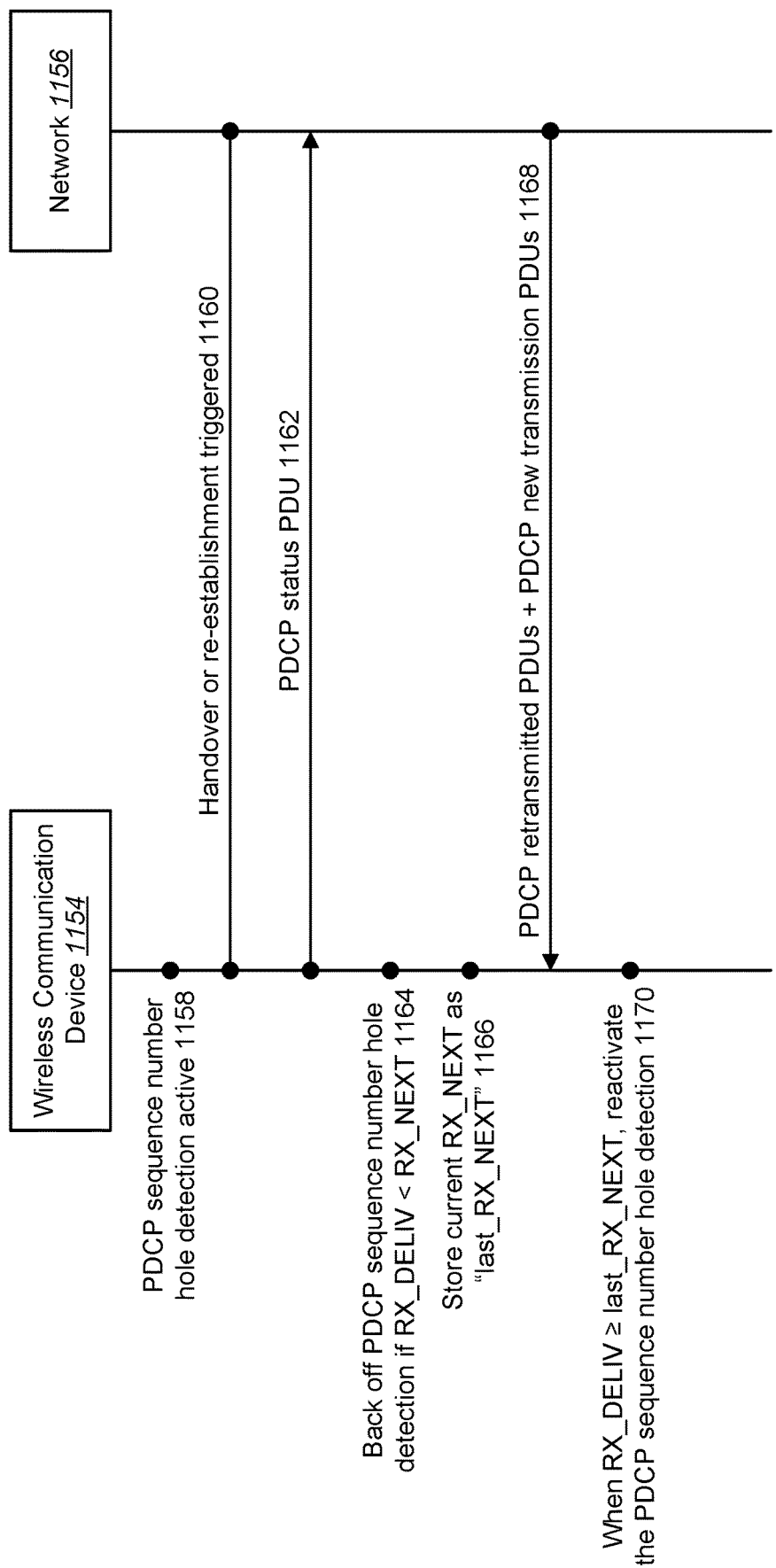
FIG. 11 is a thread diagram illustrating examples of techniques to handle PDCP PDU retransmission with handover and/or re-establishment.

FIG. 11 is a thread diagram illustrating examples of techniques to handle PDCP PDU retransmission with handover and/or re-establishment. In some examples, a receiving entity (e.g., wireless communication device, UE, etc.) may be configured to report one or more missing PDCP PDUs to a transmitting entity (e.g., base station, network, eNB, gNB, etc.). During a handover procedure or a re-establishment procedure, the receiving entity of the PDCP(s) may construct and transmit a PDCP status PDU to report the missing PDCP PDUs to the transmitting entity. In some examples, the PDCP status PDU may carry the missing PDCP count information from RX_DELIV to RX_NEXT. Handover may occur when the receiving entity (e.g., wireless communication device, UE, etc.) moves to a coverage area of another (e.g., neighboring) base station and a link is established between the receiving entity and the other base station. Re-establishment may occur when a link is re-established between the receiving entity and the network (e.g., the same base station). In some cases when the network retransmits the missing PDCP PDUs (due to handover or re-establishment, for instance), the in-sequence RLC sequence numbers might not carry in-sequence PDCP sequence numbers until all of the retransmission PDUs are transmitted by the network.

In some examples, some of the techniques described herein (e.g., detection techniques) may be backed off (e.g., paused, suspended, etc.) during handover or re-establishment and/or after handover or re-establishment until a timer expires or until all holes have been filled. For instance, to reduce or avoid misdetection of missing PDCP sequence numbers during handover or re-establishment and/or after handover or re-establishment, some of the techniques described herein (e.g., layered missing packet detection, PDCP sequence number hole detection, etc.) may be backed off (e.g., paused, suspended, etc.) until RX_DELIV moves past the RX_NEXT value recorded at the time of handover or re-establishment when the PDCP status PDU was constructed. RX_DELIV may move when a running reordering timer (e.g., t-reordering) expires or when all the holes have been filled via the retransmission from the network. In some examples, missing PDCP packet detection may be suspended in response to a handover or re-establishment trigger in a case that the sequence number of the last PDCP packet received in-sequence (e.g., RX_DELIV or RX_DELIV-1) is less than a lower edge of an RLC window (e.g., RX_NEXT, RX_NEXT-1, VR(R), or VR(R)-1).

Examples of techniques for a wireless communication device 1154 and/or a network 1156 (e.g., one or more base stations) to handle PDCP sequence number hole detection for handover or re-establishment are illustrated in FIG. 11. The wireless communication device 1154 may be an example of the wireless communication device 102 described in relation to FIG. 1. One or more of the techniques described in relation to FIG. 11 may be performed in conjunction with one or more of the functions, operations, techniques, methods 400, 500, 600, 700, 800, etc., described herein.

In the example of FIG. 11, PDCP sequence number hole detection may be active 1158 on the wireless communication device 1154 (e.g., the wireless communication device 1154 may monitor for a layered missing PDCP packet and/or for a PDCP sequence number hole). For instance, the wireless communication device 1154 may perform missing PDCP detection and/or PDCP sequence number hole detection as described in relation to FIG. 1, FIG. 4, FIG. 5, FIG. 6, FIG. 7, and/or FIG. 8.

Handover or re-establishment may be triggered 1160. For instance, the wireless communication device 1154 and/or the network 1156 may trigger 1160 a handover procedure if another base station (besides a current serving base station, for instance) can provide improved signal strength. In some examples, the wireless communication device 1154 and/or the network 1156 may trigger 1160 a re-establishment procedure (due to signaling loss, carrier setting update, service area re-entry, etc., for instance).

The wireless communication device 1154 may send 1162 a PDCP status PDU 1162 to the network 1156. The PDCP status PDU may report one or more missing PDCP PDUs to the network 1156 and/or may carry the missing PDCP count information from RX_DELIV to RX_NEXT.

The wireless communication device 1154 may back off 1164 PDCP sequence number hole detection if RX_DELIV is less than RX_NEXT (or if RX_DELIV-1 is less than RX_NEXT-1, for example). For instance, the wireless communication device 1154 may compare RX_DELIV to RX_NEXT. If RX_DELIV is less than RX_NEXT, the wireless communication device 1154 may back off (e.g., pause, suspend, deactivate, etc.) PDCP sequence number hole detection.

The wireless communication device 1154 may store 1166 the current RX_NEXT as a "last_RX_NEXT." In some examples, the current RX_NEXT may be stored as a most recent (e.g., "last") RX_NEXT (corresponding to a time of the PDCP status PDU, for instance).

The network 1156 may send 1168 one or more PDCP retransmitted PDUs and/or one or more PDCP new transmission PDUs. For example, when handover or re-establishment is achieved, the network 1156 may re-transmit any missing PDCP PDU (according to the PDCP status PDU, for instance) to the wireless communication device 1154 and/or may transmit one or more new PDCP PDUs to the wireless communication device 1154.

The wireless communication device 1154 may reactivate 1170 the PDCP sequence number hole detection when RX_DELIV is greater than or equal to last_RX_NEXT. For instance, the wireless communication device 1154 may compare RX_DELIV to last_RX_NEXT. If RX_DELIV is greater than or equal to last_RX_NEXT, the wireless communication device 1154 may reactivate (e.g., resume, continue, etc.) the PDCP sequence number hole detection. For instance, the wireless communication device 1154 may resume missing PDCP detection and/or PDCP sequence number hole detection as described in relation to FIG. 1, FIG. 4, FIG. 5, FIG. 6, FIG. 7, and/or FIG. 8. In some examples, one or more of the operations described in relation to FIG. 11 may be performed using VR(R) or VR(R)-1 instead of RX_NEXT (e.g., RX_NEXT-1) or in addition to RX_NEXT (e.g., RX_NEXT-1).

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" may describe "based only on" and/or "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some examples of the functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, compact disc read-only memory (CD-ROM) or other optical disk storage, magnetic disk storage or other magnetic storage devices, or any other medium that can be used to carry or store program code in the form of instructions and/or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

Implementation examples are described in the following numbered clauses:

Clause 1. A method performed by a wireless communication device, comprising determining a packet data convergence protocol (PDCP) packet count corresponding to a last radio link control (RLC) packet received in-sequence; and detecting a missing PDCP packet based on a comparison of the PDCP packet count and a sequence number of a last PDCP packet received in-sequence.

Clause 2. The method of clause 1, wherein the comparison of the PDCP packet count and the sequence number comprises determining whether the sequence number is less than the PDCP packet count.

Clause 3. The method of any preceding clause, further comprising establishing communication with a first bearer and a second bearer, wherein the PDCP packet count is associated with the first bearer; and determining a second PDCP packet count corresponding to a second last RLC packet received in-sequence that is associated with the second bearer, wherein detecting the missing PDCP packet is further based on a second comparison of the second PDCP packet count and the sequence number.

Clause 4. The method of clause 3, wherein the comparison of the PDCP packet count and the sequence number comprises determining whether the sequence number is less than the PDCP packet count, wherein the comparison of the second PDCP packet count and the sequence number comprises determining whether the sequence number is less than the second PDCP packet count, and wherein the missing PDCP packet is detected in a case that the sequence number is less than the PDCP packet count and the sequence number is less than the second PDCP packet count.

Clause 5. The method of any preceding clause, further comprising suspending missing PDCP packet detection in response to a handover or re-establishment trigger in a case that the sequence number of the last PDCP packet received in-sequence is less than a lower edge of an RLC window.

Clause 6. The method of any preceding clause, further comprising stopping a PDCP reordering timer in response to detecting the missing PDCP packet.

Clause 7. The method of any preceding clause, further comprising adjusting the sequence number based on the PDCP packet count in response to detecting the missing PDCP packet.

Clause 8. The method of any preceding clause, further comprising flushing, to a layer above a PDCP layer, one or more packets in a series of packets up to the PDCP packet count.

Clause 9. The method of any preceding clause, further comprising triggering the detecting based on a PDCP reordering timer.

Clause 10. The method of any preceding clause, wherein the missing PDCP packet occurs without a missing RLC packet.

Clause 11. A wireless communication device in combination with any of the preceding clauses, the wireless communication device including a memory and a processor in electronic communication with the memory, where the wireless communication device is configured to perform any of the methods of any of the preceding clauses.

Clause 12. A non-transitory tangible computer-readable medium in combination with any of the methods of clauses 1-10, where the non-transitory tangible computer-readable medium stores computer-executable code for causing a processor to perform any of the methods of clauses 1-10.

Clause 13. An apparatus in combination with any of the methods of clauses 1-10, where the apparatus includes means for performing any of the methods of clauses 1-10.

The invention claimed is:

1. A wireless communication device, comprising:
one or more memories;
one or more processors in communication with the one or more memories, wherein the one or more processors are individually or collectively configured to cause the device to:
  determine a packet data convergence protocol (PDCP) packet count corresponding to a last radio link control (RLC) packet received in-sequence;
  detect a missing PDCP packet based on a comparison of the PDCP packet count and a sequence number of a last PDCP packet received in-sequence;
  establish communication with a first bearer and a second bearer, wherein the PDCP packet count is associated with the first bearer; and
  determine a second PDCP packet count corresponding to a second last RLC packet received in-sequence that is associated with the second bearer, wherein the detection of the missing PDCP packet is further based on a second comparison of the second PDCP packet count and the sequence number.

2. The wireless communication device of claim 1, wherein the one or more processors are individually or collectively configured to cause the device to perform the comparison of the PDCP packet count and the sequence number by determining whether the sequence number is less than the PDCP packet count.

3. The wireless communication device of claim 1, wherein the first bearer is a New Radio (NR) bearer and the second bearer is a Long Term Evolution (LTE) bearer.

4. The wireless communication device of claim 1, wherein the one or more processors are individually or collectively configured to cause the device to:
  perform the comparison of the PDCP packet count and the sequence number by determining whether the sequence number is less than the PDCP packet count;
  perform the second comparison of the second PDCP packet count and the sequence number by determining whether the sequence number is less than the second PDCP packet count; and
  detect the missing PDCP packet in a case that the sequence number is less than the PDCP packet count and the sequence number is less than the second PDCP packet count.

5. The wireless communication device of claim 1, wherein the one or more processors are individually or collectively configured to cause the device to stop a PDCP reordering timer in response to detecting the missing PDCP packet.

6. The wireless communication device of claim 1, wherein the one or more processors are individually or collectively configured to cause the device to adjust the sequence number based on the PDCP packet count in response to detecting the missing PDCP packet.

7. The wireless communication device of claim 1, wherein the one or more processors are individually or collectively configured to cause the device to flush, to a layer above a PDCP layer, one or more packets in a series of packets up to the PDCP packet count.

8. The wireless communication device of claim 1, wherein the one or more processors are individually or collectively configured to cause the device to trigger the detection based on a PDCP reordering timer.

9. The wireless communication device of claim 1, wherein the missing PDCP packet occurs without a missing RLC packet.

10. A method performed by a wireless communication device, comprising:
establishing communication with a first bearer and a second bearer;
determining a packet data convergence protocol (PDCP) packet count corresponding to a last radio link control (RLC) packet received in-sequence, wherein the PDCP packet count is associated with the first bearer;
determining a second PDCP packet count corresponding to a second last RLC packet received in-sequence that is associated with the second bearer; and
detecting a missing PDCP packet based on a comparison of the PDCP packet count and a sequence number of a last PDCP packet received in-sequence, wherein detecting the missing PDCP packet is further based on a second comparison of the second PDCP packet count and the sequence number.

11. The method of claim 10, wherein the comparison of the PDCP packet count and the sequence number comprises determining whether the sequence number is less than the PDCP packet count.

12. The method of claim 11, wherein the first bearer is a New Radio (NR) bearer and the second bearer is a Long Term Evolution (LTE) bearer.

13. The method of claim 11, wherein the comparison of the PDCP packet count and the sequence number comprises determining whether the sequence number is less than the PDCP packet count, wherein the comparison of the second PDCP packet count and the sequence number comprises determining whether the sequence number is less than the second PDCP packet count, and wherein the missing PDCP packet is detected in a case that the sequence number is less than the PDCP packet count and the sequence number is less than the second PDCP packet count.

14. The method of claim 10, further comprising stopping a PDCP reordering timer in response to detecting the missing PDCP packet.

15. The method of claim 10, further comprising adjusting the sequence number based on the PDCP packet count in response to detecting the missing PDCP packet.

16. The method of claim 10, further comprising flushing, to a layer above a PDCP layer, one or more packets in a series of packets up to the PDCP packet count.

17. The method of claim 10, further comprising triggering the detecting based on a PDCP reordering timer.

18. The method of claim 10, wherein the missing PDCP packet occurs without a missing RLC packet.

19. A non-transitory tangible computer-readable medium storing computer-executable code, comprising:
code for causing the processor to establish communication with a first bearer and a second bearer;
code for causing a processor to determine a packet data convergence protocol (PDCP) packet count corresponding to a last radio link control (RLC) packet received in-sequence, wherein the PDCP packet count is associated with the first bearer;
code for causing the processor to determine a second PDCP packet count corresponding to a second last RLC packet received in-sequence that is associated with the second bearer; and
code for causing the processor to detect a missing PDCP packet based on a comparison of the PDCP packet count and a sequence number of a last PDCP packet received in-sequence, wherein the code for causing the processor to detect the missing PDCP packet is further based on a second comparison of the second PDCP packet count and the sequence number.

20. The computer-readable medium of claim 19, wherein the code for causing the processor to detect the missing PDCP packet comprises code for causing the processor to determine whether the sequence number is less than the PDCP packet count.

21. The computer-readable medium of claim 19, further comprising code for causing the processor to stop a PDCP reordering timer in response to detecting the missing PDCP packet.

22. The computer-readable medium of claim 19, further comprising code for causing the processor to adjust the sequence number based on the PDCP packet count in response to detecting the missing PDCP packet.

23. An apparatus, comprising:
    means for establishing communication with a first bearer and a second bearer;
    means for determining a packet data convergence protocol (PDCP) packet count corresponding to a last radio link control (RLC) packet received in-sequence, wherein the PDCP packet count is associated with the first bearer;
    means for determining a second PDCP packet count corresponding to a second last RLC packet received in-sequence that is associated with the second bearer; and
    means for detecting a missing PDCP packet based on a comparison of the PDCP packet count and a sequence number of a last PDCP packet received in-sequence, wherein the means for detecting the missing PDCP packet is further based on a second comparison of the second PDCP packet count and the sequence number.

24. The apparatus of claim 23, wherein the means for detecting the missing PDCP packet comprises means for determining whether the sequence number is less than the PDCP packet count.

25. The apparatus of claim 23, further comprising means for stopping a PDCP reordering timer in response to detecting the missing PDCP packet.

26. The apparatus of claim 23, further comprising means for adjusting the sequence number based on the PDCP packet count in response to detecting the missing PDCP packet.

* * * * *